United States Patent
Paul et al.

[11] Patent Number: 5,224,450
[45] Date of Patent: Jul. 6, 1993

[54] MULTI-FUEL PRECOMBUSTOR UNIT

[76] Inventors: Marius A. Paul; Ana Paul, both of 1120 E. Elm Ave., Fullerton, Calif. 92631

[21] Appl. No.: 927,174

[22] Filed: Aug. 7, 1992

[51] Int. Cl.⁵ .............................................. F02B 19/02
[52] U.S. Cl. ..................................... 123/292; 123/274
[58] Field of Search ............... 123/255, 266, 267, 274, 123/292

[56] References Cited

U.S. PATENT DOCUMENTS

| | | | |
|---|---|---|---|
| 3,077,868 | 2/1963 | Georges | 123/292 X |
| 3,919,984 | 11/1975 | Yagi et al. | 123/292 X |
| 4,827,882 | 5/1989 | Paul et al. | 123/292 |
| 4,854,281 | 8/1989 | Hareyama et al. | 123/292 |
| 5,054,443 | 10/1991 | Kawamura | 123/292 X |

FOREIGN PATENT DOCUMENTS

| | | | |
|---|---|---|---|
| 0167271 | 5/1934 | Switzerland | 123/292 |
| 0436824 | 10/1935 | United Kingdom | 123/292 |

*Primary Examiner*—Willis R. Wolfe
*Attorney, Agent, or Firm*—Bielen, Peterson & Lampe

[57] ABSTRACT

A multi-fuel precombustor unit having a housing with an internal precombustion chamber and a passage communicating between the precombustion chamber and the main combustion chamber of the engine on which the precombustor unit is installed, the unit having a valve member blocking the communicating passage with an actuator allowing controlled retraction of the valve member upon activation of a valve actuation mechanism. A compressed air delivery passage regulated by a valve communicates between the main combustion chamber the precombustion chamber for delivery of compressed air to the precombustion chamber, the air delivery providing a carrier for fuel metered into the passage for delivery to the precombustion chamber for initial combustion before release to the main combustion chamber.

10 Claims, 3 Drawing Sheets

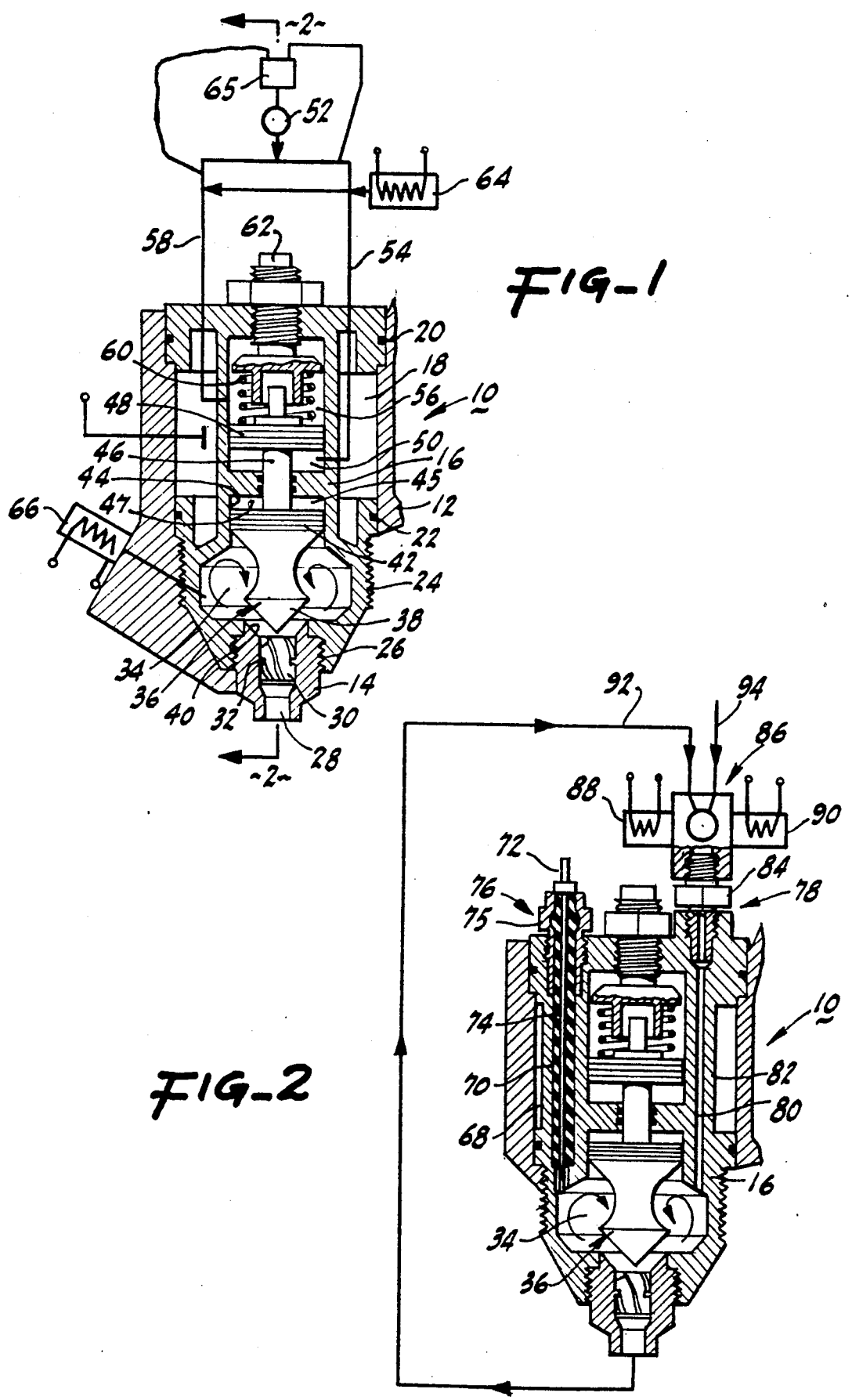

MULTI-FUEL PRECOMBUSTOR UNIT

BACKGROUND OF THE INVENTION

This invention relates to a multi-fuel, precombustor unit that provides a combustion system for any type of fuel, liquid or gas, or a combination of both liquid and gas. The combustor unit can be used in any type of engine, spark ignited or compression ignited. The combustor unit is particularly useful in adapting a diesel engine to natural gas or methanol. In such units direct conversion, where gas is supplied to the air intake, performance is compromised. The low pressure natural gas displaces a volume of air, and on compression of the mixture, a substantial reduction in power may result. Furthermore, the compression ratio must be reduced from the operating level of diesel fuel to match the acceptable octane number of a gas-air mixture. The combustion of the gas-air mixture is usually very explosive with an unusually high heat release that generates oxides of nitrogen. Attempts to inject the gas into the cylinder during the later part of the compression require high pressure gas compressors that provide a substantial drain on the net work output of the engine. Similar problems arise from converting gasoline engines to natural gas or exotic gas and liquid fuel combinations.

The precombustor unit of this invention has application further as an auxiliary component for installation into diesel engines for trucks and buses that are used in urban environments. Diesel engines are extremely inefficient at low speeds of operation and generate noxious emissions, particularly hydrocarbon particulate matter. Often diesel engines in buses and trucks must remain in operation while the vehicle is stopped for long periods of time to maintain on-board, electrical power generation equipment for lighting or refrigeration. At such idle speeds, the engine is operating at its worst efficiency, generating noxious fumes in the area of the idled vehicle. Switching to the use of an auxiliary fuel supply to power the engine at low end speeds is both fuel effective and useful to substantially abate pollution. Particularly when a natural gas fuel is used, the levels of pollution drop dramatically.

SUMMARY OF THE INVENTION

The multi-fuel, precombustor unit of this invention is a combination fuel injector, fuel-air mixing device and a precombustion chamber. Key to efficient operation of the unit is the use of a compressed-air delivery passage from the engine to the precombustion chamber of the unit. The supply of compressed air through the delivery passage provides a carrier for fuel released into the passage by a fuel metering device. By appropriate regulation of the flow of compressed air and the flow of fuel, an ideal premix for precombustion can be obtained. Generally, this premix is rich in fuel to allow for complete combustion when the precombusted gases are mixed with compressed air from the main combustion chamber and released back into the main chamber where combustion is completed. Separation of the precombustion gases from the compressed air in the main chamber is controlled by an electronically regulated valve. On retraction of the valve, the passage between the precombustion chamber and the main chamber of the engine is opened.

The precombustion chamber is similar to that described in our U.S. Pat. No. 4,827,882, entitled Internal Regenerative Combustion Engines with Thermal Integrated Optimized Systems, issued, May 9, 1989. The precombustion unit here disclosed is distinguishable from the device disclosed in the referenced patent by isolating the precombustion chamber from the main chamber and by supplying compressed air from the main chamber to the precombustion chamber via a route that enables the supplied compressed air to carry the released liquid fuel or gas fuel to the precombustion chamber. The rich mixture carried into the precombustion chamber is fully atomized by the air, preheated and homogenized with residual hot gases remaining from the prior cycle, creating an ideal premixture.

As the precombustion chamber is isolated from the main chamber, the precombustion process is totally free of any restrictions related to the nature of fuel, whether liquid or gas, and the quality of fuel and its octane or centane number. The entire process is selfcharging and is fully regulated by electronic control from a conventional central processor. The central processor generates an electronic signal that activates the electromagnetic valves regulating the supply of fuel and air. Additionally, the displaceable valve that separates the precombustion chamber from the main chamber is actuated by electronically controlled valves to enable the premix in the precombustion chamber to communicate with the highly compressed air in the main chamber at the appropriate time in the operating cycle. In general, on retraction a final rush of pressurized air from the main chamber enters the precombustion chamber for a final violent mix of igniting gases before the combustion gases are forcefully ejected through the communicating passage into the main chamber for final mix with any remaining gases and forced displacement of the displaceable member, usually the piston, of the thermal engine.

By specially configuring the retractable valve and the communicating air passage, a swirling torroidal mixture occurs for a maximized, progressive flame front between the premix in the precombustion chamber during the influx of air transferred from the main chamber toward the precombustion chamber. Although a violent mixture occurs, the heat release is controlled, eliminating formation of nitrogen oxides and release of monoxide and hydrocarbon pollutants. The controlled combustion prevents explosive detonation and knocking in the engine. The violently mixing combustion gases in the precombustion chamber are then forcefully emitted to the main chamber for driving the positive displacement mechanism of the engine. These and other features will become apparent from a consideration of the Detailed Description of the Preferred Embodiments described hereafter.

BRIEF DESCRIPTION OF THE DRAWINGS

FIG. 1 is a cross sectional view of the precombustor unit.

FIG. 2 is a cross sectional view of the precombustor unit taken on the lines 2—2 in FIG. 1.

DETAILED DESCRIPTION OF THE PREFERRED EMBODIMENTS

Figure 3:
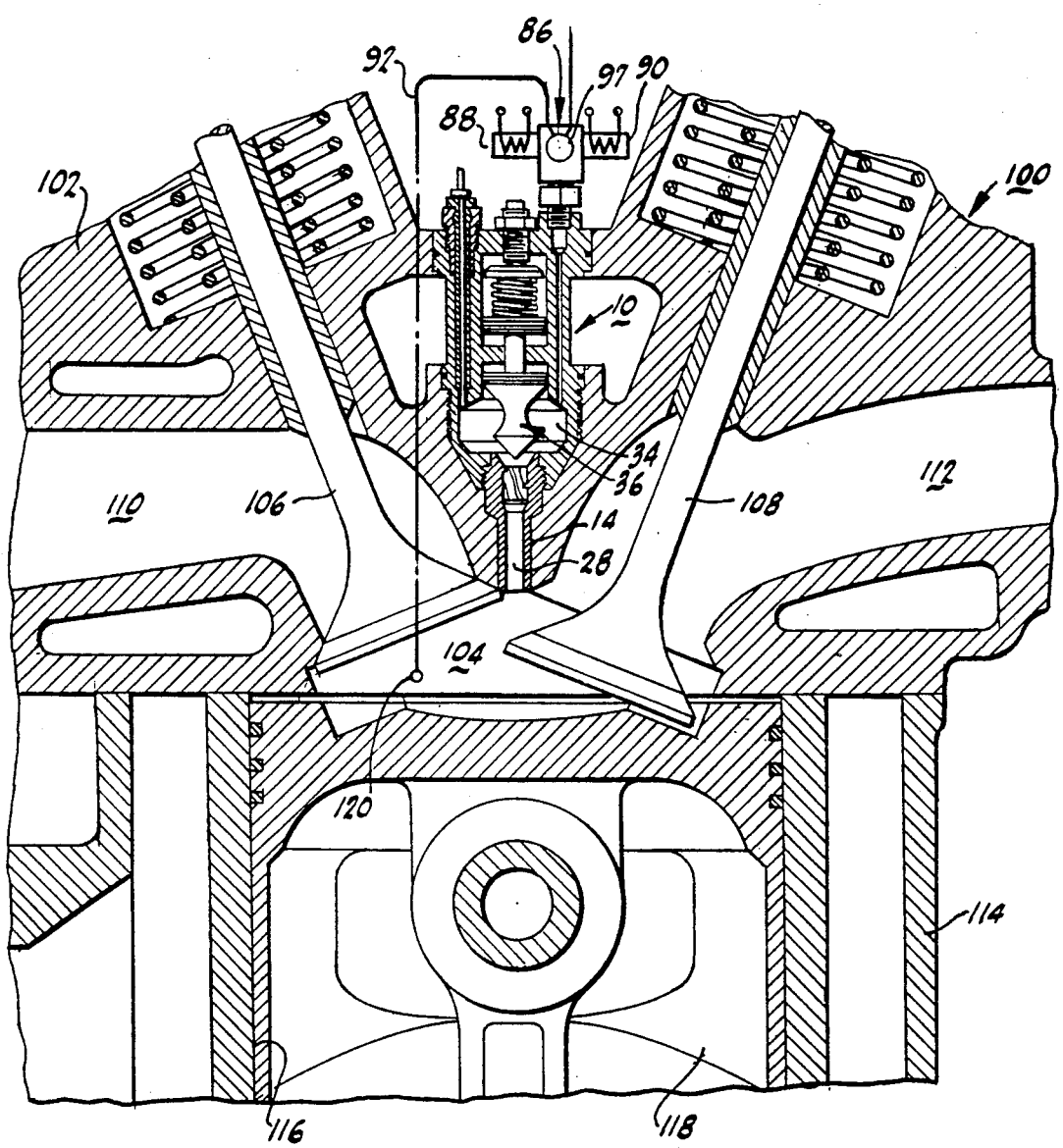
FIG. 3 is a cross sectional view of the precombustor unit in a portion of a conventional reciprocal engine.

The multi-fuel, precombustor unit, designated generally by the reference numeral 10, is shown in cross section in FIGS. 1 and 2. The precombustor unit 10 is designed for installation in a variety of engines to enable an efficient clean burning of a gas fuel, a liquid fuel, or a combination of both fuels. The precombustor unit 10 of this invention is a combination fuel injector, fuel-air mixing device and a precombustion chamber. With minor modification, the unit can be installed on many preexisting engines to improve fuel efficiency and pollution reduction, as well as integrated into new engines specially designed for low pollution energy production.

Figure 4:
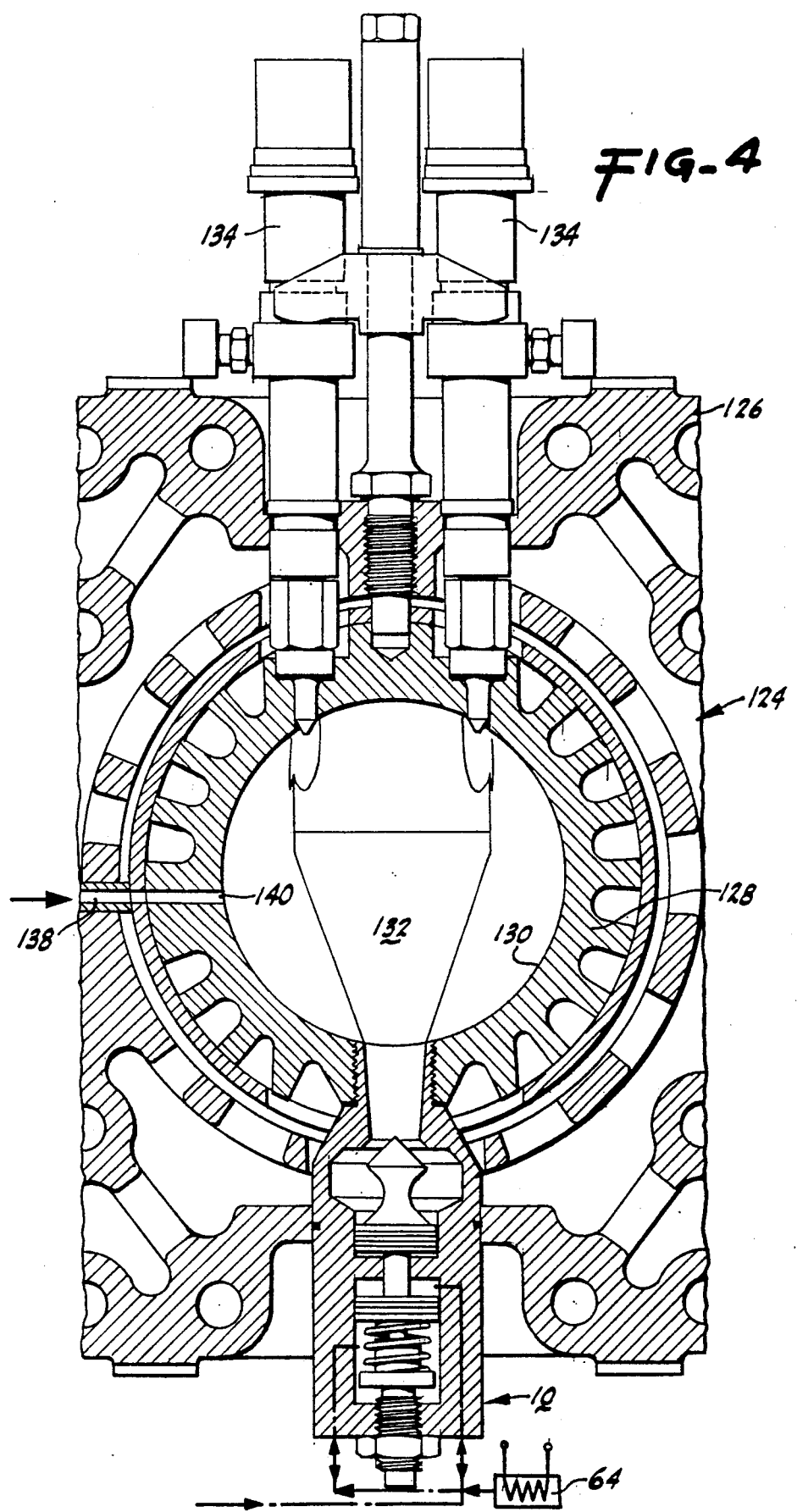
FIG. 4 is a cross sectional view of the precombustor unit in a portion of a high pressure, reciprocal engine.

Referring to the cross sectional illustration of FIG. 1, the injector unit 10 is seated in the engine structure 12 such that the injection nozzle 14 is in communication with the combustion chamber (not shown in FIGS. 1 and 2) the engine structure 12 can be any conventional structure such as an engine block or an engine head as shown in the exemplars of FIGS. 3 and 4, described hereafter. The multi-fuel precombustor unit 10 has a cylindrical housing 16 that may include an outer configuration that cooperates with the engine structure 12 to form a cooling jacket 18 located between the precombustor unit housing and the engine structure. Seals 20 and 22 prevent any leakage of a cooling fluid circulating under pressure in the cooling jacket 18.

The housing 16 includes a threaded end segment 24 to couple the precombustor unit 10 to the engine structure 12 and an internal threaded segment 26 to allow connection of the end nozzle 14. The end nozzle 14 may be fabricated of a special high temperature resistant material and is fabricated with an internal discharge passage 28 with a section 30 having helical splines 32 for generating a violent swirl to the discharging gases ejected from within the precombustor unit 10.

The multi-fuel, precombustor unit 10 incudes an internal precombustion chamber 34 having an annular configuration defined in part by a central valve head 36 with an hour-glass configuration to impart a torroidal swirl to admitted gases and fuel for a thorough mixture during the ignition and discharge process. The valve head 36 has a conical tip 38 of high temperature material that seats in a beveled recess 40 in the specially constructed and configured nozzle 14. The valve head 36 has a piston-like skirt 42 that reciprocates in guide cylinder 44. The piston skirt 42 and guide cylinder form a damping chamber 45 having a relief passage 47 to the crank case or air intake for cycling any leaked gas or hydraulic fluid to the combustion chamber of the engine for pollution controlled disposal.

The valve head 36 is connected to a valve stem 46, which in turn connects to a hydraulic piston 48.

The hydraulic piston 48 comprises a double acting piston with a first hydraulic chamber 50 hydraulically connected to a high pressure, hydraulic fluid source 52 through high pressure hydraulic line 54. A second hydraulic chamber 56 is connected to the high pressure, hydraulic fluid source 52 through high pressure line 58. The double acting hydraulic piston 48 is biased in the valve head closure position by a compression spring 60 seated on a spring tensor mechanism 62 to allow adjustment of the force of the spring action of the spring 60 against the piston 48. The double acting piston 48 is actuated by a solenoid operated slide valve 64 shown schematically in FIG. 1. The solenoid operated slide valve 64 selectively connects one of the two hydraulic chambers 50 and 56 to the high pressure hydraulic source 52 in this case a hydraulic pump, with the other chamber being connected to the low pressure supply 65 providing a supply reservoir for the pump source 52, forcing the hydraulic piston 48 and the connected valve head toward or away from the beveled recess 40 in the nozzle 14. The beveled recess 40 acts as a valve seat which coacts with the valve head to open or close the communication passage 28 between the engine combustion chamber and the precombustion chamber 34 of the precombustion unit 10

Although fuel is automatically delivered to the precombustion chamber and subsequently to the engine by the compression chamber means shown in FIG. 2, an auxiliary high pressure fuel injector 66 can be added to the system to inject one or more pulses of fuel to the precombustion chamber, where specially warranted, for example, in a high performance engine where a high output, power surge is required.

Referring now to FIG. 2, the cross sectional view is orthogonal to the cross sectional view of FIG. 1. In FIG. 2, the fuel admission and ignition components are shown. The housing 16 includes a thickened wall segment 68 that includes a bore 70 leading to the precombustion chamber 34 in which installed an ignitor assembly 76 with a sparking electrode 72 having an outer insulator 74 and a threaded collet 76 for installing in the housing 16. The ignitor assembly 76 produces a spark directed to the internal volume of the precombustion chamber 34 for igniting fuel air mixtures in the chamber.

Positioned opposite the ignitor assembly 76 is a fuel admission assembly 78. The fuel admission assembly 78 includes an elongated passage 80 in an enlarged segment 82 of the housing 16 that is connected to a threaded nipple coupler 84 that connects a fuel-air mixing valve 86, shown schematically in FIG. 2. The fuel air mixing valve 86 has an independent solenoid control 88 and 90 for adjusting the flow of intake air through compressed air line 92 and pressurized fuel line 94. The air in the air line is pressurized by an air compressor that preferable is the engines ordinary compression stroke. Fuel in the fuel line is pressurized by an ordinary low pressure fuel pump for a liquid ore gas. The independent control of the fuel and air flow allows for instant adjustment where necessary to accommodate for load conditions or other operating directives from conventional manual or computer control sources, not herein described. The preferred fuel-air mixing valve may comprise a conventional slide valve and may include a third solenoid actuator 97 where it is desired to concurrently supply two forms of fuel to the precombustor unit, for example, natural gas and methanol. Also, depending on the application of the multi-fuel, precombustor unit 10, the size, type of engine, and the environment of use multiple precombustor units can be employed in each engine cylinder and multiple ignitor assemblies and fuel-air admission assemblies can be incorporated into each precombustor unit.

Referring now to FIG. 3, one environment of preferred use is shown. The multi-fuel, precombustor unit 10 is shown installed in a conventional reciprocal engine 100. The combustor unit 10 is threaded into the engine head 102 over the main combustion chamber 104 between the intake valve 106 and the exhaust valve 108 which protect, respectfully, the intake passage 110 and the exhaust passage 112. The engine head 102 is connected to a block 114 having at least one cylinder 116 with a piston 118 reciprocal therein. The precombustor unit 10 has a nozzle 14 with an elongated internal passage 28 to provide for initial rush of compressed air into the precombustion chamber and subsequent explosive rush of air out of the precombustion chamber after ignition upon retraction of the valve head 36 at the appropriate time in the engine cycle. An orifice 12 in the combustion chamber 104 directs compressed air through a compressed air line 92 to the fuel-air mixing valve 86, as schematically shown.

In operation, the piston 118 rises to its top dead center position in the compression stroke, forcing a stream of highly compressed air through the orifice 120 and into the combustion chamber 34. The compressed air carries fuel released to the passage during the early stage of air charging upon actuation of the fuel actuator 90. One or more pulses of fuel can be admitted as desired by appropriate profile of the electronic signal to the solenoid actuators. In the cycle period of compression, both the engine intake valve 106 and the exhaust valve 108 are closed to permit the maximum compression to be achieved with the valve head 38 initially closed, combustion of the rich fuel/air mixture commences and at an appropriate time the valve head 36 is retracted explosively ejecting the rich air/fuel mixture, and then eject into the main combustion chamber 104. In the main combustion chamber 104, the remaining compressed air in the chamber violently mixes with the ejected burning fuel/air mix to fully combust all of the fuel and heat the gases for the high pressure expansion stroke of the engine. In a four stroke engine, the combusted gases are exhausted by the displacement action of the piston 118 with the exhaust valve 108 open as shown in FIG. 3. The small amount of combustion gases remaining in the precombustion chamber provide for preheating of the incoming fuel/air mixture from the fuel-air mixing valve 86 on the next compression stroke.

Referring now to FIG. 4, a partial view of a section of a high pressure, opposed-piston engine 124 is shown. The engine 124 has a block 126 with a liner 128 forming a cylinder 130 with side mounted fuel injector units 134 for injecting fuel into the chamber for driving one or two pistons (not shown) that reciprocate in the cylinder 130. The multi-fuel, precombustor unit 10 is side mounted, opposite the fuel injectors 134 and may be utilized as a precombustor unit for providing a flame front for igniting the discharged fuel from the fuel injectors 134, or, alternately as an auxiliary fuel supply that may operate independently of the fuel injectors 134, for example, when powering the unit under preload or idle conditions. In this manner, the engine can maintain its operation under highly efficient fuel consumption and pollution abatement conditions, where fuel injectors are ineffective for complete combustion at low operating speeds. The multi-fuel, precombustor unit 10 has an air supply passage 138 connected to an orifice 140 communicating with the combustion chamber 132. This passage 138 automatically supplies the compressed air for the precombustor unit 10 for injection into the engine as previously described.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A precombustor unit for installation in a thermal engine having means for generating compressed air for mixing with a fuel for combustion in a main combustion chamber in the engine, the precombustor unit comprising:
    a housing having means for installing the precombustion unit in the engine, the housing having an internal precombustion chamber with a discharge passage that communicates with the main combustion chamber of the engine when the unit is installed in the engine;
    a displaceable valve head in the housing, where the housing includes a valve seat at the discharge passage and the valve head is seatable on the valve seat to block discharge passage from communicating with the precombustion chamber;
    actuating means connected to the valve head for selectively displacing the valve head into seating engagement with the valve seat, wherein the discharge passage is closed, and for retracting the valve head from a seating engagement, wherein the discharge passage is open;
    a compressed air passage communicating with the precombustion chamber and having means for selectively communicating with the means of the thermal engine for generating compressed air, wherein compressed air from the engine is delivered to the precombustion chamber; and
    a fuel supply means communicating with the compressed air passage for supplying fuel to the compressed air passage wherein a fuel-air mixture is delivered to the precombustion chamber.

2. The precombustor unit of claim 1 wherein the actuating means comprises a hydraulic cylinder in the housing and a double acting piston connected to the valve head displaceable in the hydraulic cylinder, the actuating means having further, valve control means for regulating displacement of the double acting piston in the hydraulic cylinder.

3. The precombustor unit of claim 2 wherein the actuating means has spring means in contact with the double acting piston to bias the valve head against the valve seat.

4. The precombustor unit of claim 1 comprising further, an ignitor assembly having a sparking electrode extending into the precombustion chamber.

5. The precombustor unit of claim 1 wherein the means for selectively communicating with the compressed air means of the engine comprises an electronically activated valve.

6. The precombustor unit of claim 1 wherein the fuel supply means includes an electronically controlled metering valve wherein fuel is selectively supplied to the compressed air passage.

7. The precombustor unit of claim 6 wherein the fuel supply means includes multiple electronically controlled metering valve wherein different fuel are selectively supplied to the compressed air passage.

8. The precombustor unit of claim 1 wherein the precombustion chamber is cylindrical and the valve head has an hour-glass configuration with a conical tip contactable with the valve seat and centrally positioned in the precombustion chamber, wherein air and fuel are torroidally mixed in the precombustion chamber.

9. The precombustor unit of claim 1 in combustion with a reciprocal engine.

10. The precombustor unit of claim 1 having a damping means for damping displacement of the valve head.

* * * * *